M. SEWARD.
Machine for Upsetting and Forming Articles from Metallic Bars.
No. 59,464.  Patented Nov. 6, 1866.
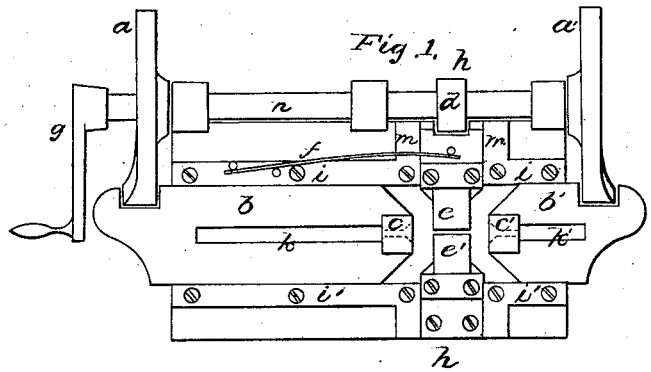
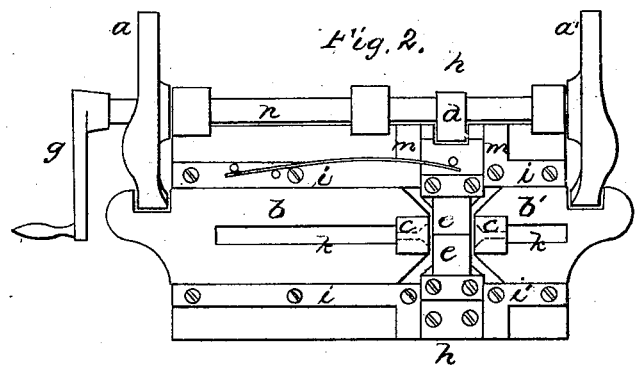
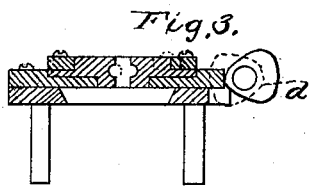
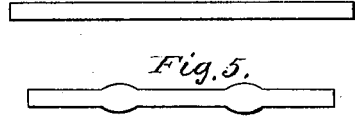
Witnesses:  
George F. Gardner  
Lucius G. Peck
Inventor:  
Moses Seward M. SEWARD.
Machine for Upsetting and Forming Articles from Metallic Bars.
No. 59,464. Patented Nov. 6, 1866.
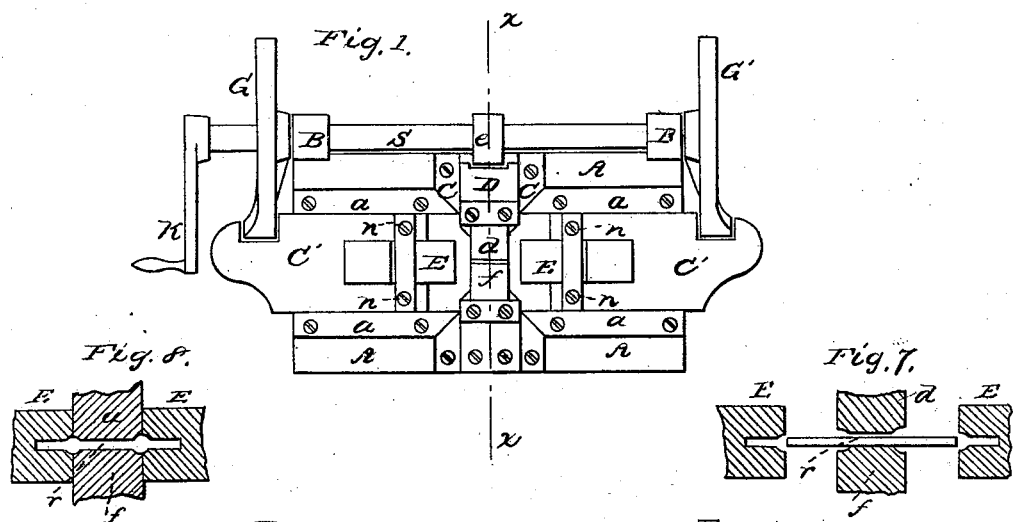
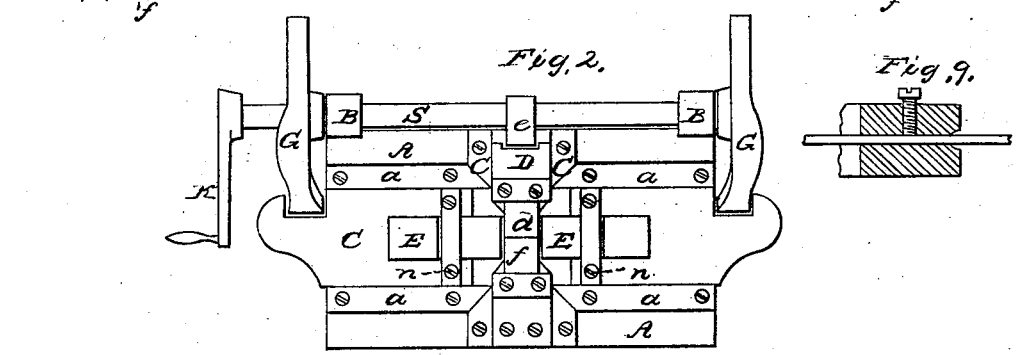
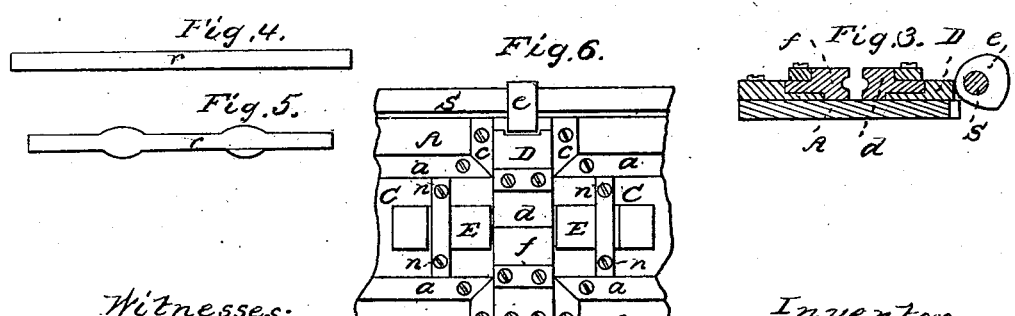
Witnesses:
George F. Gardner
Lucius G. Peck
Inventor
Moses Seward

UNITED STATES PATENT OFFICE.

MOSES SEWARD, OF NEW HAVEN, CONNECTICUT.

IMPROVED MACHINE FOR UPSETTING AND FORMING ARTICLES FROM METALLIC RODS OR BARS.

Specification forming part of Letters Patent No. 59,464, dated November 6, 1866.

*To all whom it may concern:*

Be it known that I, MOSES SEWARD, of the town and county of New Haven, and State of Connecticut, have invented a new and useful Machine for Upsetting and Forming Articles Made of Metallic Rods or Bars; and I do hereby declare that the following is a full, clear, and exact description of the same, reference being had to the accompanying drawings, in which—

Figure 1 is a vertical view of the machine open, ready to receive the rod or bar to be upset. This view shows the operating parts of the machine—viz., the upsetting-cams $a\,a'$, the slides $b\,b'$, upsetting-dies $c\,c'$, closing-cam $d$, the closing or holding jaws $e\,e'$, the opening-spring $f$, and the crank $g$, for which, in a working machine, a pulley is substituted. Fig. 2 is a like view of the machine, with the holding-jaws closed and the other parts of the machine in the position in which the upsetting-pressure is strongest. Fig. 3 is a sectional view in the direction of the dotted line $h\,h$. Fig. 4 represents the raw material before being subjected to the action of the machine, and Fig. 5 one of the results which may be produced by the same.

The working parts are placed on a frame sufficiently strong to give entire steadiness, and in proportion to the size of the work to be done. Upon the frame is placed a bed, to which the ways $i\,i$ are fastened, and upon which the slides $b\,b'$ move between the ways. These ways are beveled inward, so that the slides are wider at the bottom than at the top, to prevent them from throwing upward when subjected to great pressure.

The upsetting-dies $c\,c'$ are firmly fastened to the slides, and are moved back and forth by the side cams on the wheels $a\,a'$. The jaw $e'$ is fastened to the bed, while the jaw $e$, sliding between the ways $m\,m$, is pressed forward by the cam $d$, holding the rough material firmly while the upsetting-cams are in operation, and immediately afterward thrown back by the spring $f$.

The width of the holding-jaws $e$ and $e'$ should correspond to the distance the upsettings are to be apart; and for short rods or bars the upsetting-dies $c\,c'$ should move from the holding-jaws far enough to allow the rod $r$ to be upset to be dropped in between them, as seen in Fig. 7. Cause the shaft to turn; the cam $d$ will force the jaw $e$ forward to grasp and hold the rod. This done, the upsetting-dies $c\,c'$ are each and simultaneously forced toward the holding-jaws by their respective cams $a\,a'$, the ends of the rod entering the dies until they rest against the bottom of the sink; then that portion between the swaging and holding dies will be compressed so as to cause the rod to expand and fill the dies, as see Fig. 8, and the finished rod in Fig. 5. The movement of the cams continued will open the dies, the spring $f$ serving to force back the jaw $e$, so that the upset rod may be removed, another blank placed therein, and in like manner upset.

To adjust for different lengths or sizes of rods or bars, insert dies of the proper form; if for longer distances between the upsettings, place broader holding-jaws, (see Fig. 6,) and set the upsetting-dies farther apart, as also seen in Fig. 6, or farther back on their respective slides. Should the upsetting be required on a longer bar than it would be convenient to place between the upsetting-dies, the hole or sink in the said dies may be made entirely through the same, and the bar or rod pass through the dies, and there clamped or held, as seen in Fig. 9, in lieu of resting against the bottom of the dies. Otherwise, the operation is the same as for short rods.

Having therefore fully described my invention, what I claim as new and useful, and desire to secure by Letters Patent, is—

The holding-dies $e$ and $e'$, with upsetting-dies $c$ and $c'$, or their equivalents, when arranged and combined so as to upset the metal placed therein in two places at one time, and operating substantially as herein set forth.

MOSES SEWARD.

In presence of—
LUCIUS G. PECK,
GEORGE F. GARDINER.